M. CHATTLE.
ENGINE STARTER.
APPLICATION FILED APR. 16, 1919.
1,352,353.
Patented Sept. 7, 1920.
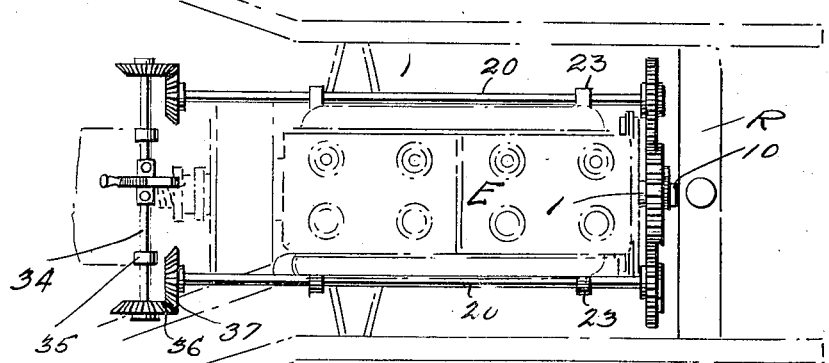
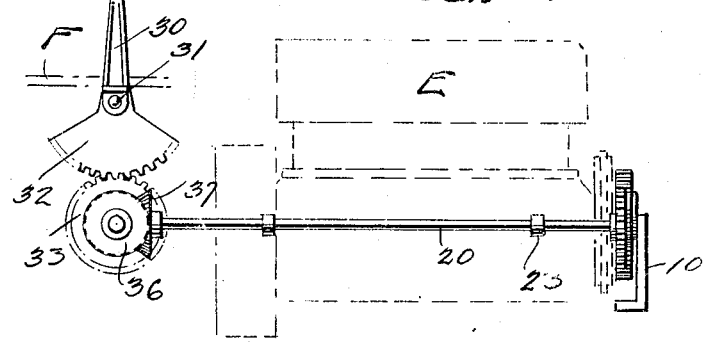
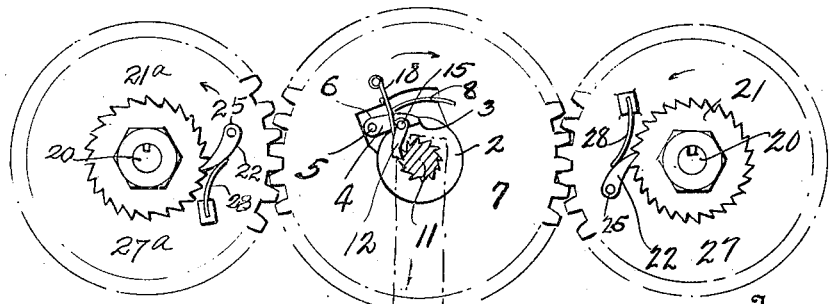
Inventor
Michael Chattle

UNITED STATES PATENT OFFICE.

MICHAEL CHATTLE, OF WAUNA, OREGON.

ENGINE-STARTER.

1,352,353.  Specification of Letters Patent.  Patented Sept. 7, 1920.

Application filed April 16, 1919. Serial No. 290,484.

*To all whom it may concern:*

Be it known that I, MICHAEL CHATTLE, a citizen of the United States, residing at Wauna, in the county of Clatsop and State of Oregon, have invented certain new and useful Improvements in Engine-Starters, of which the following is a specification.

This invention relates to internal combustion engines, and more especially to cranking devices; and the object of the same is to produce means whereby an automobile engine can be cranked by the operator while sitting in his seat.

Another object is to prevent backfiring from injuring the operator of the machine.

Another object is to adapt the device to automobile engines of a variety of types.

Other objects will appear in the following specification and claims. In the drawings—

Figure 1 is a plan view of this machine complete, and showing the automobile engine in dotted lines, and Fig. 2 is a side elevation thereof.

Fig. 3 is an enlarged front view.

We are concerned only with the automobile engine E back of the radiator R, and with the floor boards F in rear of the dash. The main shaft 1 has a disk 2 fast on its front end, and this is provided with a notch 3 as shown in Fig. 3. This notch is adapted to be engaged by the tip of a pawl 4 pivoted at 5 within a recess 6 which is formed in a gear wheel 7 loosely mounted on the main shaft, and the tip of the pawl is thrown normally into said notch by means of a spring 8. It follows that when the gear is turned in the direction of the arrow thereon, the pawl will engage the disk and will turn the main shaft in the proper direction to crank the engine.

Fixed on an arm 10 rising from a suitable support is a ratchet 11 engaged by the tip of a second pawl which I prefer to call a push bar 12. This pawl or bar is pivoted at 15 to the main pawl 4, and is borne normally toward the ratchet by means of a spring 18; but the length of the push bar 12 is such that, when the engine back-fires and the disk 2 rotates in a direction the reverse of the arrow, the main pawl 4 will move to the left only a little distance before the secondary pawl or push bar 12 will straighten out radially and will disengage the tip of the main pawl from the notch 3. On the other hand, as long as the disk 2 is turned in the proper direction or to the right as necessary in cranking the machine, the tip of the pawl 4 remains within the notch 3 while the tip of the pawl 12 travels around the ratchet 11. Therefore, means must be provided to turn the gear 7 to the right in order to crank the machine, but yet to permit it to turn a short distance to the left when the engine backfires.

Extending alongside the engine E are shafts 20 which are mounted in suitable bearings 23, and at the front end of these shafts 20 there are carried the ratchet wheels 21 and 21ᵃ engaged by the pawls 22 pivoted at 25 to the gear wheels 27 and 27ᵃ meshing with the main gear 7, while the springs 28 throw the tips of the pawls normally toward the ratchets. The gear wheels 27 and 27ᵃ it will be understood, are loosely mounted upon the shafts 20 so as to rotate independently thereof. This construction permits the gears 27 and 27ᵃ to be employed to rotate the main gear 7, when the shafts 20 are oscillated rather than rotated.

The driving mechanism herein illustrated is made up of a crank or lever 30 pivoted at 31 and having below its pivot a toothed segment 32 engaging a gear 33 on a cross shaft 34 mounted in suitable bearings 35, and beveled gears 36 and 37 connect each end of this shaft with one of the side shafts 20. When now the lever is moved as indicated by dotted lines in Fig. 2, the shaft 34 is oscillated, as is each of the side shafts 20. When the rock shaft is moved it will actuate the shafts 20 so that they will rotate in opposite directions and so as to actuate either the ratchet 21 or 21ᵃ depending upon the direction in which the lever 30 is moved. For instance if the lever 30 is moved toward the engine it will be seen that the shaft upon which is situated the ratchet 31 will rotate in a counterclockwise direction thus causing the ratchet 21 to engage the pawl 22 thereby rotating the gear wheel 27 which will impart clockwise motion to the main gear wheel 7. Thus it will be clear that, while I might use but a single side shaft 20, the use of two such shafts permits the application of power continually to the main gear 7 and therefore to the main shaft 1. Yet I apprehend that some engines may be so built that one of the side shafts 20 must be dispensed with, because it could not be located conveniently. Therefore, I reserve the widest latitude in this respect.

In fact, it might be possible to convey power to the main gear 7 through other mechanism without departing from the spirit of my invention so far as the latter relates to the construction providing for safety in the event of back fire.

The foregoing description and the drawings have reference to what may be considered the preferred, or approved form of my invention. It is to be understood that I may make such changes in construction and arrangement and combination of parts, materials, dimensions, et cetera, as may prove expedient and fall within the scope of the appended claims.

Having thus fully described my invention, what I claim as new and desire to secure by Letters Patent is:—

1. In an automobile engine starter, the combination with a notched disk fast on the engine shaft, a gear wheel loosely mounted on said shaft, a pawl pivoted in the gear wheel and with its tip engaging said disk, and means for disengaging the tip from the disk when the engine back-fires; of shafts extending alongside the engine, gears loosely mounted on their front ends and meshing with said main gear, pawl and ratchet mechanism for connecting the shafts with their respective driving gears, a rock shaft across the rear end of the side shafts and geared thereto, and a lever for oscillating the rock shaft, for the purpose set forth.

2. In a cranking device, the combination with a disk fastened to the crank shaft of an automobile engine; of a main gear wheel rotatably mounted upon said shaft, means carried by said main gear wheel for engaging said disk so as to actuate same, two driving gears engaging said main gear, shafts alongside said automobile engine on which said driving gears are loosely mounted, pawl and ratchet mechanism connecting the shafts with the respective driving gears and manually operable mechanism at the rear ends of said shafts for turning them intermittently as described.

3. In a cranking device, the combination with a disk fastened to the crank shaft of an automobile engine, of a main gear wheel rotatably mounted upon said shaft, ratchet means carried by said gear wheel for engaging said disk so as to actuate same, two driving gears engaging said main gear, shafts mounted alongside the automobile engine on which said driving gears are loosely mounted, pawl and ratchet mechanism connecting the shafts with the respective driving gears, and manually operable mechanism at the rear ends of said shafts for turning them intermittently as described.

4. In a cranking device, the combination with a disk fastened to the crank shaft of an automobile engine; of a main gear wheel rotatably mounted upon said shaft, means carried by said gear wheel for engaging said disk so as to actuate the same, two driving gears engaging said main gear, shafts mounted alongside the automobile engine and to which said driving gears are loosely mounted, means carried by said gears for engaging said shafts to be actuated thereby, and manually operable mechanism at the rear ends of said shafts for turning them intermittently as described.

In testimony whereof I affix my signature in presence of two witnesses.

MICHAEL CHATTLE.

Witnesses:
 WILLIAM SCHMIDT,
 CHARLES HENRY HARRIS.